United States Patent
Kinoshita et al.

(10) Patent No.: US 7,058,300 B2
(45) Date of Patent: Jun. 6, 2006

(54) DATA TRANSMISSION RATE ARBITRATION METHOD AND OPTICAL COMMUNICATION APPARATUS

(75) Inventors: Keisuke Kinoshita, Katano (JP);
Satoshi Furusawa, Osaka (JP);
Masaru Fuse, Neyagawa (JP); Susumu Morikura, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 816 days.

(21) Appl. No.: 10/125,392

(22) Filed: Apr. 19, 2002

(65) Prior Publication Data
US 2002/0154352 A1 Oct. 24, 2002

(30) Foreign Application Priority Data
Apr. 20, 2001 (JP) .............................. 2001-123231

(51) Int. Cl.
H04B 10/08 (2006.01)
H04B 17/00 (2006.01)
H04L 12/28 (2006.01)
H04L 12/56 (2006.01)

(52) U.S. Cl. .......................... 398/28; 398/32; 398/142; 370/395.61

(58) Field of Classification Search ................. 398/28, 398/30, 32, 141, 142; 370/395.61, 395.62
See application file for complete search history.

(56) References Cited

U.S. PATENT DOCUMENTS

| 6,215,793 | B1 * | 4/2001 | Gultekin et al. | 370/465 |
| 6,509,988 | B1 * | 1/2003 | Saito | 398/47 |
| 2004/0081233 | A1 * | 4/2004 | Bremer et al. | 375/222 |

FOREIGN PATENT DOCUMENTS

| EP | 000994422 A2 * | 4/2000 |
| JP | 2000-124913 | 4/2000 |

* cited by examiner

Primary Examiner—Jason Chan
Assistant Examiner—Nathan Curs
(74) Attorney, Agent, or Firm—Wenderoth, Lind & Ponack, L.L.P.

(57) ABSTRACT

A transmitting-end device generates a pilot signal with a pilot signal generation section, and transmits a pilot signal to a receiving-end device. At the receiving-end device, a transmission rate modification section detects the transmission band of an optical transmission line based on the amplitude of the pilot signal, and decides a data transmission rate acceptable to the receiving-end device by taking into account the transmission band of the optical transmission line. Based on a maximum data transmission data acceptable to the transmitting-end device and the data transmission rate thus decided, a control section in the receiving-end device arbitrates a data transmission rate between it and the transmitting-end device.

10 Claims, 10 Drawing Sheets

DATA TRANSMISSION RATE ARBITRATION METHOD AND OPTICAL COMMUNICATION APPARATUS

BACKGROUND OF THE INVENTION

1. Field of the Invention

The present invention relates to a data transmission rate arbitration method, and more particularly to a data transmission rate arbitration method for use in an optical communication system which decides an intra-device data transmission rate based on a transmission band of an optical transmission line.

2. Description of the Background Art

In recent years, digital devices have come into practical use, and digital networks have become increasingly more prevalent. The IEEE1394 standard provides an example interface for interconnecting digital devices. The IEEE1394 standard defines a number of data transmission rates from 100 Mbps to 3200 Mbps. According to the IEEE1394 standard, communications between devices can be performed in such a manner that data transmissions are allowed to occur between devices having different data transmission rates. In a digital network which allows data transmissions to occur at a plurality of data transmission rates, it is necessary to decide a data transmission rate to be used between devices (hereinafter referred to as the "intra-device data transmission rate") prior to each data transmission. In a conventional digital network, an intra-device data transmission rate is decided based only on a data transmission rate which is acceptable to each device. Specifically, the information of a data transmission rate which is acceptable to each device is conveyed to another device by using a control signal, and the lower one of the two data transmission rates that are acceptable to the interested devices is designated as the data transmission rate between the two devices.

On the other hand, the IEEE1394 standard contemplates the use of optical fibers as an alternative transmission line to the conventional electrical cables, with a view to realizing a higher data transmission rate and enabling connection over longer distances. FIG. 10 is a block diagram illustrating the structure of a conventional optical communication system. Hereinafter, an arbitration operation for data transmission rates between devices, which is performed in the case where the conventional optical communication system shown in FIG. 10 is adopted in a network which permits the use of a plurality of data transmission rates, will be described.

The optical communication system comprises devices 91 and 92, which are coupled via an optical transmission line 93. The device 91 includes a storage section 911, a data transmission rate arbitration section 912, and an optical transmission/reception section 913. The device 92 includes a storage section 921, a data transmission rate arbitration section 922, and an optical transmission/reception section 923. A data transmission rate arbitration occurs as the data transmission rate arbitration sections 912 and 922 transmit and receive the information of the maximum data transmission rate which is acceptable to each device by using control signals. The control signals are signals used for transmitting information such as data transmission rates, detection of a connection, response to the detection of a connection, and notification of a completion of the data transmission rate arbitration. In general, low-frequency signals are used as the control signals. After detection of a connection, the data transmission rate arbitration section 912 in the device 91 transmits the information of the maximum data transmission rate acceptable to the device 91, which is stored in the storage section 911, to the device 92. Similarly, the data transmission rate arbitration section 922 in the device 92 transmits the information of the maximum data transmission rate acceptable to the device 92, which is stored in the storage section 921, to the device 91. The data transmission rate arbitration section 912 in the device 91 compares the maximum data transmission rate acceptable to the device 92, which has been transmitted from the device 92, against the maximum data transmission rate acceptable to the device 91, which is stored in the storage section 911. Based on the comparison, the data transmission rate arbitration section 912 transmits to the device 92 the information of the data transmission rate having a smaller value, by using a control signal. Thereafter, the data transmission rate arbitration sections 912 and 922 keep exchanging the data transmission rate information until the transmitted data transmission rate information and the received data transmission rate information reach the same value. Once the same value is reached by the respective data transmission rate information, the devices 91 and 92 add information notifying the completion of the data transmission rate arbitration to the data transmission rate information, and transmit a control signal, thereby completing the data transmission rate arbitration. Thus, it becomes possible for the devices 91 and 92 to perform data transmissions based on a data transmission rate which is compliant with both a data transmission rate which is acceptable to each device and a data transmission rate which is acceptable to each other device.

As mentioned above, it is possible to utilize an optical fiber as a transmission line. Depending on the purposes, various types of optical fibers having various transmission band characteristics are available. For example, based on the materials, optical fibers can be classified into GOFs (Glass Optical Fibers), PCFs (Polymer-clad Fibers), POFs (Plastic Optical Fibers), and the like. Based on another type of classification, optical fibers can be classified into step index (SI) fibers, graded index (GI) fibers, and the like. The transmission band characteristics of optical fibers may differ depending on the material and/or type of the optical fiber as listed above. The transmission band characteristics may also vary depending on the transmission distance over the optical fiber.

As described above, so many types of optical fibers are currently available. One implication of this is that two optical fibers which are apparently of the same connect shape may have different transmission bands. Stated otherwise, an optical fiber may be physically connectable without having satisfactory transmission band characteristics. Therefore, without knowing the actual transmission band of the optical fiber, a user may connect an optical fiber which does not satisfy desired transmission band characteristics. It is also possible for the same optical fiber to keep being used after a device to which the optical fiber is connected is changed. In such cases, too, the optical fiber may keep being used although not satisfying the desired transmission band characteristics.

As described above, it is possible that a given intra-device data transmission rate and the transmission band of a given optical transmission line may not match, resulting in an inadequate transmission band. Yet, the decision of the data transmission rate in a conventional optical communication system is based only on the data transmission rate which is acceptable to each device, i.e., without taking into account the transmission band of the optical transmission line. As a result, a conventional data transmission rate arbitration process may designate a data transmission rate which does not actually correspond to the transmission band of the optical transmission line. In such cases, data transmissions between devices cannot occur, resulting in a communication failure.

As an example, a case will be considered in which an optical fiber is employed as the optical transmission line 93 in the optical communication system shown in FIG. 9. It is assumed that the devices 91 and 92 both accept data transmission rates of 100 Mbps, 200 Mbps, and 400 Mbps, and that the optical fiber used has transmission band characteristics such that a signal can be transmitted therethrough at a data transmission rate of 200 Mbps or less. Under these assumptions, a conventional optical communication system would decide the data transmission rate based only on the data transmission rate which is acceptable to the devices 91 and 92, and therefore set the data transmission rate to be 400 Mbps. However, the optical fiber can only transmit signals therethrough at a data transmission rate of 200 Mbps or less. Thus, the transmission band of the optical fiber is inadequate with respect to the decided data transmission rate, making it impossible to perform communications between the devices 91 and 92.

SUMMARY OF THE INVENTION

Therefore, an object of the present invention is to provide a data transmission rate arbitration method and an optical communication apparatus which detects a transmission band of an optical transmission line (such that signals can be transmitted through the optical transmission line within the transmission band), and decide an intra-device data transmission rate while taking into account the transmission band of the optical transmission line, thereby enabling communications without fail.

The present invention has the following features to attain the object above.

A first aspect of the present invention is directed to an optical communication system for performing a data transmission between devices via an optical transmission line, a method for arbitrating a data transmission rate between devices before performing the data transmission, the method comprising: a step of detecting a transmission band of the optical transmission line; a step of detecting a slower one of maximum data transmission rates acceptable to two devices between which a data transmission is performed; and a step of designating a data transmission rate as a data transmission rate for the data transmission, the data transmission rate being within the detected transmission band of the optical transmission line and equal to or less than the detected slower maximum data transmission rate.

Thus, according to the first aspect, when performing a data transmission rate arbitration, a data transmission rate is decided so as to be within the detected transmission band of the optical transmission line. In other words, the data transmission rate is decided by taking into account the transmission band of the optical transmission line, so that it is possible to prevent data transmissions from being performed at a data transmission rate which does not correspond to the transmission band of the optical transmission line. Thus, communications can be realized without fail.

According to a second aspect of the present invention based on the first aspect, the step of detecting the transmission band of the optical transmission line comprises: a step of transmitting a predetermined pilot signal from one of the two devices to the other device; and a step of detecting the transmission band of the optical transmission line based on a received state of the pilot signal as received by the other device.

Thus, according to the second aspect, the transmission band of the optical transmission line is detected based on a pilot signal which has actually been led through the optical transmission line. As a result, the actual transmission band of the optical transmission line can be accurately detected.

According to a third aspect of the present invention based on the second aspect, the pilot signal comprises at least one cycle signal having a predetermined cycle, and the step of detecting the transmission band of the optical transmission line based on the received state of the pilot signal comprises: a step of determining whether or not a frequency corresponding to the cycle of each of the at least one cycle signal is within the transmission band of the optical transmission line based on a waveform of the cycle signal as received by the other device; and a step of determining the transmission band of the optical transmission line based on a highest one among the frequencies which are determined as being within the transmission band of the optical transmission line.

Thus, according to the third aspect, the transmission band of the optical transmission line is determined based on the highest one among the frequencies which are determined as being within the transmission band of the optical transmission line. Since it is guaranteed on the basis of the cycle signal(s) that a transmission can successfully occur at the data transmission rate used when performing a data transmission, data transmissions between devices can occur without fail. Since the transmission band of the optical transmission line is determined based on the highest one among the frequencies at which transmissions are guaranteed possible, the data transmission rate to be used when performing a data transmission is prevented from being designated at too small a value.

According to a fourth aspect of the present invention based on the third aspect, the step of determining whether the frequency corresponding to the cycle of each of the at least one cycle signal is within the transmission band of the optical transmission line or not is performed based on whether an amplitude value of the cycle signal as received by the other device is greater than a predetermined value or not.

Thus, according to the fourth aspect, a threshold value used for the determination can be previously set based on a reception level of the cycle signal(s). Therefore, it is possible to accurately determine whether a frequency corresponding to the cycle of the cycle signal is within the transmission band of the optical transmission line or not.

According to a fifth aspect of the present invention based on the third aspect, the step of detecting the slower one of maximum data transmission rates is performed by exchanging control signals between the two devices, each control signal representing a data transmission rate acceptable to each of the two devices, and the step of determining whether the frequency corresponding to the cycle of each of the at least one cycle signal is within the transmission band of the optical transmission line or not is performed based on a comparison between an amplitude value of the cycle signal as received by the other device and an amplitude value of the control signal as received by the other device.

Thus, according to the fifth aspect, a cycle signal and a control signal which are transmitted from one device are subjected to a comparison to determine whether a frequency corresponding to the cycle of the cycle signal is within the transmission band of the optical transmission line or not. As a result, even in the case where the received state of the cycle signal may vary due to a cause associated with the device transmitting the cycle signal or losses in the optical transmission line other than inadequacy of the transmission band, it is still possible to determine whether or not a frequency corresponding to the cycle of the cycle signal is within the transmission band of the optical transmission line. Thus, according to the fifth aspect, the determination as to whether or not a frequency corresponding to the cycle of the cycle signal is within the transmission band of the optical transmission line can be made with an improved accuracy.

According to a sixth aspect of the present invention based on any of the third to fifth aspects, a number of data transmission rates having discrete values are stipulated in the optical communication system, and the cycle of each of the at least one cycle signal is set based on, among the discrete values, the value of the data transmission rate acceptable to the one device which transmits the cycle signal.

Thus, according to the sixth aspect, a cycle signal having a frequency similar to a data transmission rate which may well be employed for an actual data transmission is transmitted. Since it is only necessary to determine whether or not the optical transmission line is capable of enabling a data transmission with respect to the data transmission rate which may well be employed for an actual data transmission, the transmission of more cycle signals than necessary is precluded according to the sixth aspect.

According to a seventh aspect of the present invention based on the sixth aspect, a number of data transmission rates having discrete values are stipulated in the optical communication system, and the number of cycle signals comprised in the pilot signal is equal to the number of data transmission rates acceptable to the one device which transmits the cycle signals.

Thus, according to the seventh aspect, it is possible to determine whether or not the optical transmission line is capable of enabling a data transmission with respect to all possible data transmission rates which may well be employed for an actual data transmission. Therefore, among the data transmission rates which may well be employed an actual data transmission, the maximum data transmission rate at which the optical transmission line is capable of transmitting data is designated to be the data transmission rate. Thus, the data transmission rate is prevented from being designated at too small a value, and it is always possible to perform a data transmission at an optimum data transmission rate.

According to an eighth aspect of the present invention based on any of the second to seventh aspects, the data transmission rate arbitration method further comprises: a step of modifying, if the maximum data transmission rate acceptable to the other device receiving the pilot signal falls outside of the transmission band as determined by the step of determining the transmission band of the optical transmission line, the value of the maximum data transmission rate acceptable to the other device to a greatest one of data transmission rates which fall within the transmission band of the optical transmission line.

Thus, according to the eighth aspect, before a data transmission rate allowable to either device is determined, one of the devices between which a data transmission is performed modifies the data transmission rate acceptable to itself by taking into account the data transmission rate acceptable to the optical transmission line. Generally speaking, the processing of a data transmission rate arbitration operation is often stipulated in a standard which the system is adapted to. According to the eighth aspect, it is unnecessary to alter the processing of the arbitration operation as conventionally practiced. Thus, the present invention can be introduced into a system without requiring a change in the standard which the system is adapted to.

A ninth aspect of the present invention is directed to an optical communication apparatus for performing a data transmission with another device via an optical transmission line, wherein the optical communication apparatus arbitrates a data transmission rate between itself and the other device before performing the data transmission, comprising: a transmission band detection section for detecting a transmission band of the optical transmission line; an arbitration section for arbitrating a data transmission rate between the optical communication apparatus and the other device to ensure that the data transmission is performed at a data transmission rate which is equal to or less than a slower one of maximum data transmission rates acceptable to the optical communication apparatus and the other device; and a transmission rate restriction section for restricting the arbitration made by the arbitration section based on the transmission band detected by the transmission band detection section so that the arbitrated data transmission rate is within the transmission band detected by the transmission band detection section.

Thus, according to the ninth aspect, when performing a data transmission rate arbitration, a data transmission rate is decided so as to be within the detected transmission band of the optical transmission line. In other words, the data transmission rate is decided by taking into account the transmission band of the optical transmission line, so that it is possible to prevent data transmissions from being performed at a data transmission rate which does not correspond to the transmission band of the optical transmission line. Thus, communications can be realized without fail.

According to a tenth aspect of the present invention based on the ninth aspect, the transmission band detection section detects the transmission band of the optical transmission line based on a received state of a pilot signal which is transmitted from the other device via the optical transmission line.

Thus, according to the tenth aspect, the transmission band of the optical transmission line is detected based on a pilot signal which has actually been led through the optical transmission line. As a result, the actual transmission band of the optical transmission line can be accurately detected.

According to an eleventh aspect of the present invention based on the tenth aspect, the pilot signal transmitted from the other device comprises at least one cycle signal having a predetermined cycle, and the transmission band detection section comprises: a determination section for determining whether or not a frequency corresponding to the cycle of each of the at least one cycle signal is within the transmission band of the optical transmission line or not based on a received waveform of the cycle signal; and a transmission band decision section for determining the transmission band of the optical transmission line based on a highest one among the frequencies which are determined by the determination section as being within the transmission band of the optical transmission line.

Thus, according to the eleventh aspect, the transmission band of the optical transmission line is determined based on the highest one among the frequencies which are determined as being within the transmission band of the optical transmission line. Since it is guaranteed on the basis of the cycle signal(s) that a transmission can successfully occur at the data transmission rate used when performing a data transmission, data transmissions between devices can occur without fail. Since the transmission band of the optical transmission line is determined based on the highest one among the frequencies at which transmissions are guaranteed possible, the data transmission rate to be used when performing a data transmission is prevented from being designated at too small a value.

According to a twelfth aspect of the present invention based on the eleventh aspect, the determination section determines whether the frequency corresponding to the cycle of each of the at least one cycle signal is within the transmission band of the optical transmission line or not based on whether an amplitude value of the cycle signal is greater than a predetermined value or not.

Thus, according to the twelfth aspect, a threshold value used for the determination can be previously set based on a reception level of the cycle signal(s). Therefore, it is possible to accurately determine whether a frequency corresponding to the cycle of the cycle signal is within the transmission band of the optical transmission line or not.

According to a thirteenth aspect of the present invention based on the eleventh aspect, the determination section determines whether the frequency corresponding to the cycle of each of the at least one cycle signal is within the transmission band of the optical transmission line or not based on a comparison between an amplitude value of the cycle signal and an amplitude value of a control signal which is transmitted from the other device for the arbitration of the data transmission rate.

Thus, according to the thirteenth aspect, a cycle signal and a control signal which are transmitted from the other device are subjected to a comparison against each other to determine whether a frequency corresponding to the cycle of the cycle signal is within the transmission band of the optical transmission line or not. As a result, even in the case where the received state of the cycle signal may vary due to a cause associated with the device transmitting the cycle signal or losses in the optical transmission line other than inadequacy of the transmission band, it is still possible to determine whether or not a frequency corresponding to the cycle of the cycle signal is within the transmission band of the optical transmission line. Thus, according to the thirteenth aspect, the determination as to whether or not a frequency corresponding to the cycle of the cycle signal is within the transmission band of the optical transmission line can be made with an improved accuracy.

According to a fourteenth aspect of the present invention based on any of the ninth to thirteenth aspects, the transmission rate restriction section restricts the arbitration made by the arbitration section by modifying, if the maximum data transmission rate acceptable to the optical communication apparatus falls outside of the transmission band as detected by the transmission rate detection section, the value of the maximum data transmission rate acceptable to the optical communication apparatus to a greatest one of data transmission rates which fall within the transmission band of the optical transmission line, and the arbitration section arbitrates the data transmission rate between the optical communication apparatus and the other device after the data transmission rate is modified by the transmission rate restriction section.

Thus, according to the fourteenth aspect, the transmission rate restriction section does not affect the arbitration operation performed by the arbitration section. Therefore, even in the case where the data transmission rate arbitration operation is predetermined in a standard which the optical communication system is adapted to, the present invention can be introduced into the system without requiring a change in the standard used.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
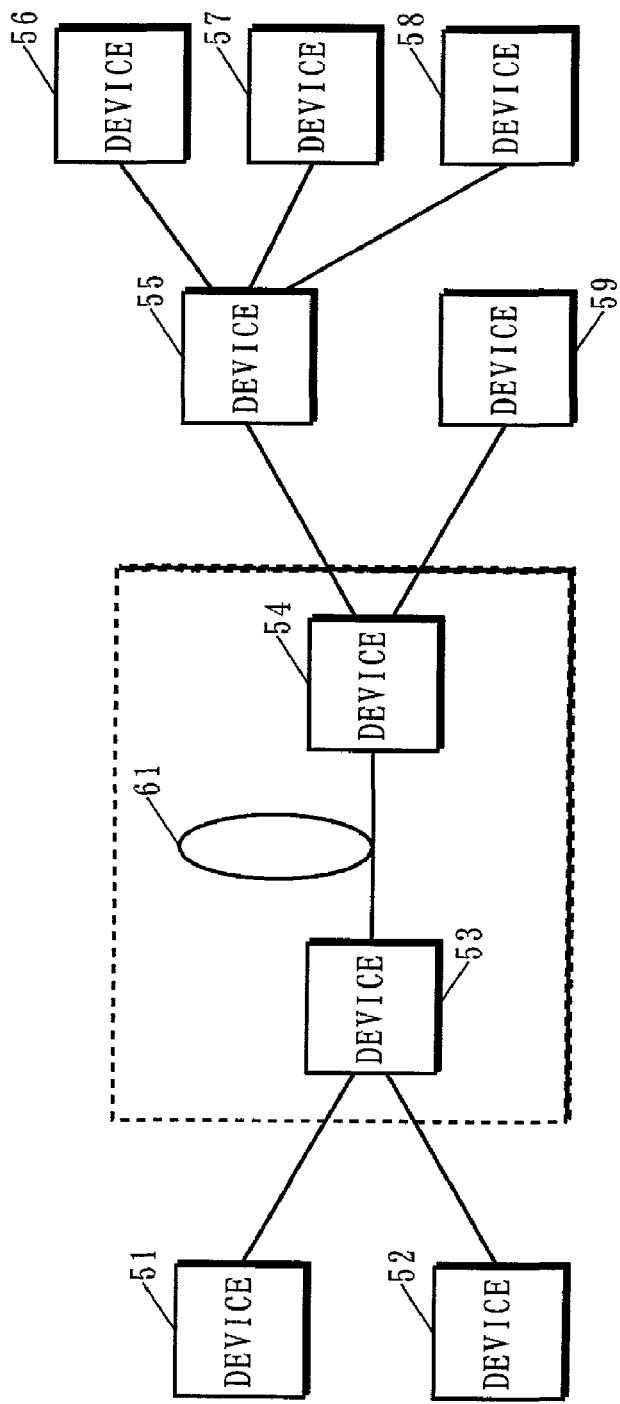
FIG. 1 is a diagram illustrating the configuration of an exemplary communication system in which the optical communication system according to the present invention is incorporated.

Prior to describing specific embodiments of the present invention, it will be first described how an optical communication apparatus according to the present invention can be employed in a communication system. FIG. 1 is a diagram illustrating the configuration of an exemplary communication system in which the optical communication system according to the present invention is incorporated. In FIG. 1, the communication system includes devices 51 to 59, the devices 53 and 54 being interconnected via an optical transmission line 61. The communications between the other devices occur in an electric (as opposed to optical) manner. Each of the devices 51 to 59 may be any device that is capable of communicating digital data, e.g., a personal computer, a printer, a digital television, or the like.

The communication system shown in FIG. 1 may be used in the case where the device 51 is a digital video camera and the device 57 is a personal computer, where data on the digital video camera is to be sent to the personal computer. It is assumed that repeaters, i.e., devices 53 and 54, are employed to realize connections between the digital video camera and the personal computer. In this system, the optical communication system according to the present invention corresponds to a portion enclosed by a dotted line in FIG. 1.

In other words, the optical communication apparatus according to the present invention is embodied as the devices 53 and 54, and the transmission rate arbitration method according to the present invention is to be used for the optical communication between the devices 53 and 54. Thus, the below-described embodiment is directed to any pair of devices capable of performing optical communications therebetween, e.g., devices 53 and 54, in a communication system comprising a plurality of interconnected devices.

Figure 2:
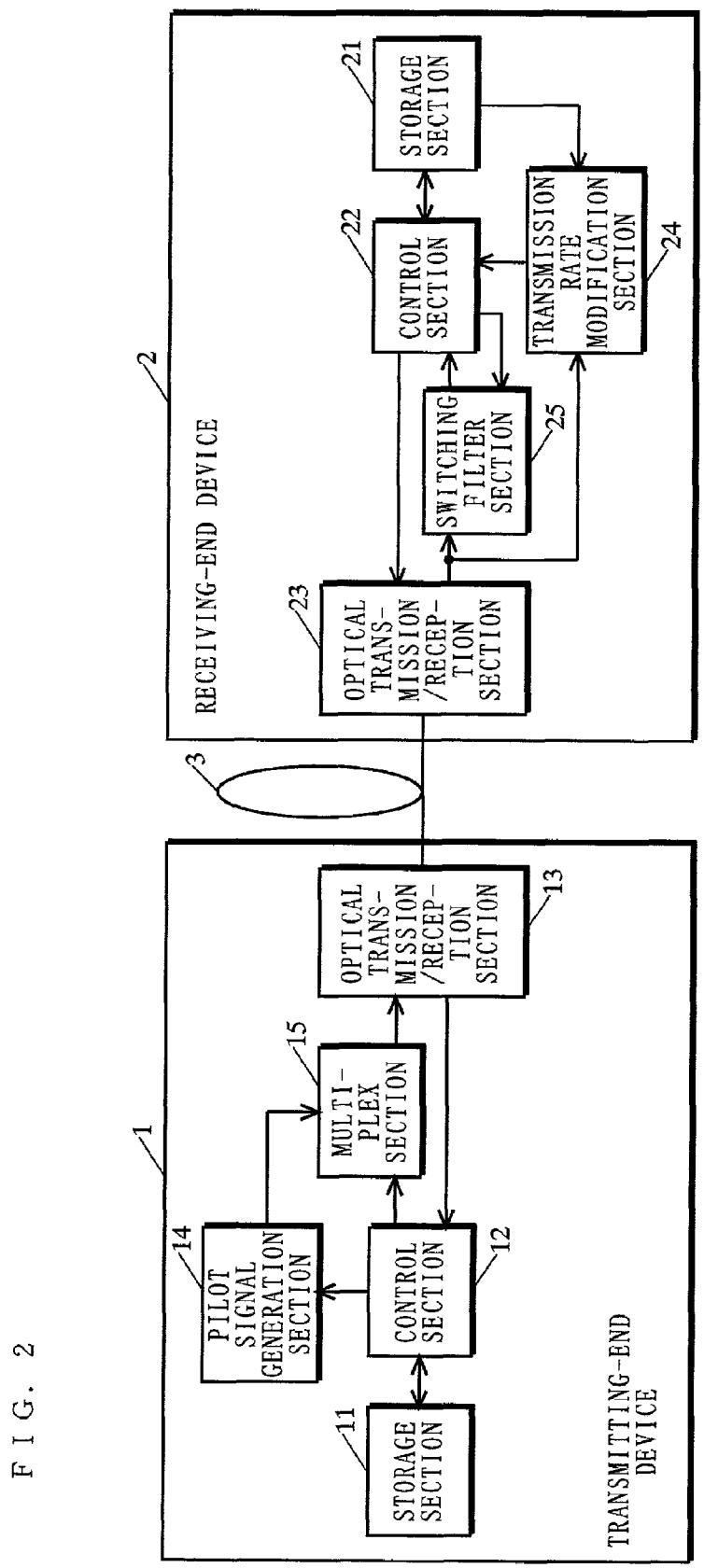
FIG. 2 is a block diagram illustrating the structure of an optical communication system according to a first embodiment of the present invention.

FIG. 2 is a block diagram illustrating the structure of an optical communication system according to a first embodiment of the present invention. The optical communication system according to the first embodiment includes a transmitting-end device 1, a receiving-end device 2, and an optical transmission line 3. The transmitting-end device 1, defined as a device which transmits a pilot signal, includes a storage section 11, a control section 12, an optical transmission/reception section 13, a pilot signal generation section 14, and a multiplex section 15. The "pilot signal" is a signal which is used for detecting the transmission band of the optical transmission line 3. In the present example, the pilot signal is a signal having a single frequency. Alternatively, a signal having a single frequency may be referred to as a "cycle signal", whereas a signal comprising a number of such cycle signals superimposed upon one another may be regarded as a "pilot signal". On the other hand, the receiving-end device 2, defined as a device to receive a pilot signal, includes a storage section 21, a control section 22, an optical transmission/reception section 23, a transmission rate modification section 24, and a switching filter section 25. Hereinafter, the structures of the respective component elements of the transmitting-end device 1 and the receiving-end device 2 will be described.

First, the structure of the transmitting-end device 1 will be described. The storage section 11 stores the information of the maximum data transmission rate acceptable to the transmitting-end device 1. The storage section 11 also stores the information of a data transmission rate transmitted from the control section 12. The information of a data transmission rate transmitted from the control section 12, which is stored in the storage section 11, is updated every time the control section 12 transmits the information of a data transmission rate. The information which remains stored after a data transmission rate arbitration operation is completed will be used during a data transmission which occurs after the data transmission rate arbitration.

Via the multiplex section 15 and the optical transmission/reception section 13, the control section 12 transmits and receives control signals to and from the receiving-end device 2. As used herein, a "control signal" is a signal used for the transmission/reception of information which is necessary for the data transmission rate arbitration. In other words, the control signals are similar to the ones conventionally used for transmitting or receiving information such as data transmission rates, detection of a connection, response to the detection of a connection, and notification of a completion of the data transmission rate arbitration. In general, the control signals are low-frequency signals, so that they are relatively free from the restrictions associated with the transmission band of the optical transmission line. The control section 12 also performs comparisons between data transmission rates, and exercises control over the pilot signal generation section 14, etc. The control section 12 may be implemented by a predetermined programmed operation performed by a CPU in the transmitting-end device 1, or may be implemented as a special chip.

The optical transmission/reception section 13 converts an electrical signal which is inputted from the multiplex section 15 to an optical signal, and outputs the resultant optical signal onto the optical transmission line 3. Moreover, the optical transmission/reception section 13 converts an optical signal which is inputted from the optical transmission line 3 to an electrical signal, and outputs the resultant electrical signal to the control section 12.

The pilot signal generation section 14 generates one or more pilot signals, which are outputted to the multiplex section 15. The generation and stopping of the pilot signal(s) is controlled by the control section 12. In the case of outputting a plurality of pilot signals, the pilot signal generation section 14 superimpose the pilot signals upon one another for output. The number of pilot signals which are outputted from the pilot signal generation section 14 and the frequencies thereof are decided in advance by a predetermined method (described later).

The multiplex section 15 multiplexes the control signal outputted from the control section 12 and the pilot signal outputted from the pilot signal generation section 14, and outputs the resultant signal to the optical transmission/reception section 13.

Next, the structure of the receiving-end device 2 will be described. The storage section 21 stores the information of the maximum data transmission rate acceptable to the receiving-end device 2. The storage section 21 also stores the information of a data transmission rate transmitted from the control section 22. The information of a data transmission rate transmitted from the receiving-end device 2, which is stored in the storage section 21, will be used during a data transmission which occurs after the data transmission rate arbitration.

Via the optical transmission/reception section 23 and the switching filter section 25, the control section 22 transmits and receives control signals to and from the transmitting-end device 1. The control section 22 also performs comparisons between data transmission rates, and exercises control over the switching filter section 25, etc. The control section 22 may be implemented by a predetermined programmed operation performed by a CPU in the receiving-end device 2, or may be implemented as a special chip.

The optical transmission/reception section 23 converts an electrical signal which is inputted from the control section 22 to an optical signal, and outputs the resultant optical signal onto the optical transmission line 3. Moreover, the optical transmission/reception section 23 converts an optical signal which is inputted from the optical transmission line 3 to an electrical signal, and outputs the resultant electrical signal to the transmission rate modification section 24 and the switching filter section 25.

The transmission rate modification section 24 receives the control signal and the pilot signal(s), and detects the actual transmission band of the optical transmission line 3 on the basis of the amplitude of the pilot signal(s). Furthermore, the transmission rate modification section 24 modifies the data transmission rate acceptable to the receiving-end device 2 to a data transmission rate which is compliant with the detected transmission band of the optical transmission line 3. The detailed structure and operation of the transmission rate modification section 24 will be described later.

While a data transmission rate arbitration operation is being performed, the switching filter section 25 removes the pilot signal(s) from the signal inputted from the optical transmission/reception section 23. After the data transmission rate arbitration operation is completed, the switching filter section 25 is switched so as to allow the signal component which is outputted from the optical transmission/reception section 23 to pass. This switching is controlled by the control section 22. The detailed structure and operation of the switching filter section 25 will be described later.

In the first embodiment, the transmitting-end device 1 transmits a pilot signal(s), and the receiving-end device 2 detects the transmission band of the optical transmission line 3 based on the received pilot signal. Alternatively, the transmitting-end device 1 and the receiving-end device 2 may each generate a pilot signal and detect the transmission band of the optical transmission line 3. In this case, the transmitting-end device 1 must additionally include a transmission rate modification section and a switching filter section, and the receiving-end device 2 must additionally include a pilot signal generation section and a multiplex section.

Next, an operation in which the transmitting-end device 1 transmits a control signal and a pilot signal(s) to the receiving-end device 2 will be described. The control signal is outputted from the control section 12 in response to a system reset, or the transmitting-end device 1 being turned on. The control section 12 requests the pilot signal generation section 14 to generate a pilot signal(s). In response, the pilot signal generation section 14 generates a pilot signal(s). The number of pilot signals outputted from the pilot signal generation section 14 and their respective frequencies are determined in the following manner.

The number of pilot signals and their respective frequencies are determined based on the maximum data transmission rate acceptable to a device and the data transmission rate(s) which is stipulated in the system. For example, let us assume that four data transmission rates, i.e., 100 MHz, 200 MHz, 400 MHz, and 800 MHz are stipulated in the optical communication system according to the present embodiment, and that the maximum data transmission rate acceptable to the transmitting-end device 1 is 400 MHz. In this case, 100 MHz, 200 MHz, and 400 MHz may be employed as the data transmission rates for data signals. Therefore, in this case, the pilot signal generation section 14 is previously set in such a manner as to superimpose three kinds of pilot signals respectively having frequencies of 100 MHz, 200 MHz, and 400 MHz upon one another for output. The frequencies of the pilot signals do not need to be exactly equal to the data transmission rates acceptable to the device, but may be any values substantially corresponding to the data transmission rates acceptable to the device. It is generally known that a successful data transmission can be guaranteed based on a frequency band (Hz) which is equal to about 70% of a given data transmission rate (bps) for signals to be transmitted.

The pilot signal(s) and the control signal are multiplexed by the multiplex section 15, and the resultant electrical signal is outputted to the optical transmission/reception section 13. The optical transmission/reception section 13 converts the electrical signal comprising the control signal and the pilot signal(s) to an optical signal, and transmits the optical signal to the optical transmission/reception section 23 in the receiving-end device 2 via the optical transmission line 3. Thus, the transmitting-end device 1 transmits the control signal and the pilot signal(s) to the receiving-end device 2.

Next, an operation in which the receiving-end device 2 modifies the maximum data transmission rate acceptable to the receiving-end device 2 by taking into account the transmission band of the optical transmission line 3, which has been detected based on the pilot signal(s), will be described. The optical transmission/reception section 23 in the receiving-end device 2 converts the optical signal received from the optical transmission line 3 to an electrical signal. The signal comprising the control signal and the pilot signal(s) which is outputted from the optical transmission/reception section 23 is outputted to the switching filter section 25 and the transmission rate modification section 24. While a data transmission rate arbitration operation is being performed, the switching filter section 25 removes the pilot signal(s) from the signal which is inputted from the optical transmission/reception section 23. As a result, only the control signal is inputted to the control section 22, with the pilot signal(s) having been removed from the signal comprising the control signal and the pilot signal(s). Hereinafter, the detailed structure and operation of the transmission rate modification section 24 will be described.

Figure 3:
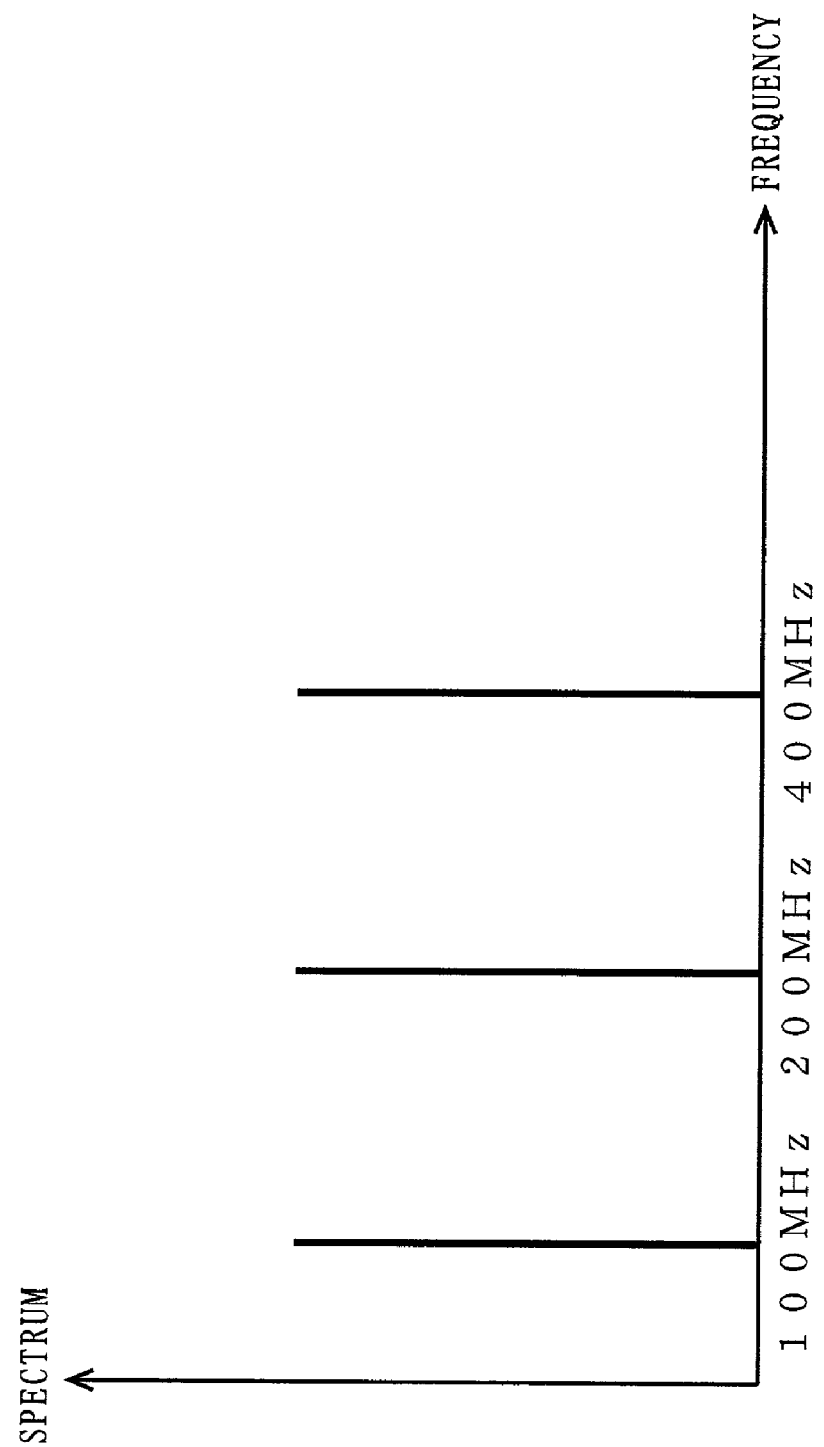
FIG. 3 is a graph illustrating exemplary spectra of pilot signals outputted from a pilot signal generation section 14 in the transmitting-end device 1.

First, with reference to FIGS. 3 and 4, a method for detecting the transmission band of the optical transmission line, which is executed in the transmission rate modification section 24, will be described. FIG. 3 is a graph illustrating exemplary spectra of pilot signals outputted from the pilot signal generation section 14 in the transmitting-end device 1.

Figure 4:
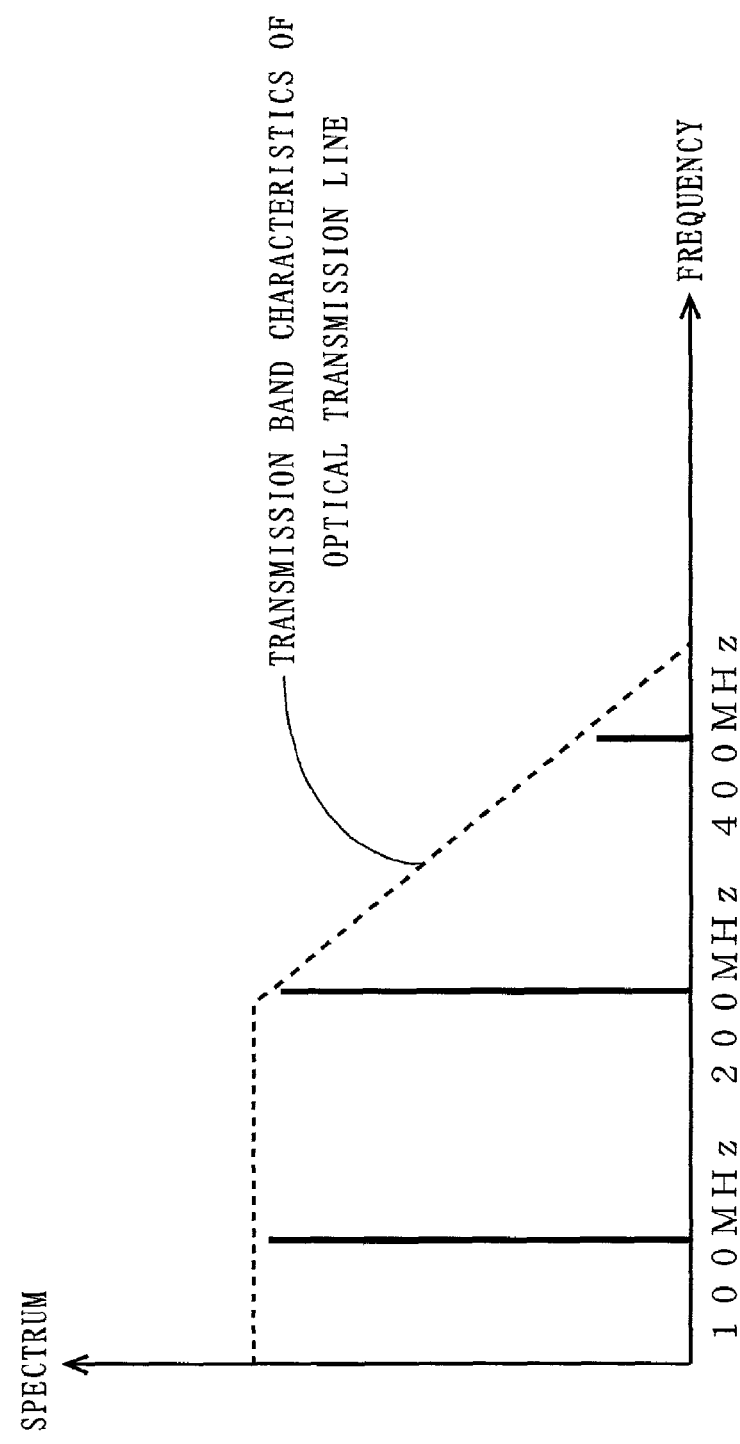
FIG. 4 is a graph illustrating exemplary spectra of pilot signals inputted to a transmission rate modification section 24 in the receiving-end device 2, and the transmission band characteristics of an optical transmission line as estimated from the spectra.

FIG. 4 is a graph illustrating exemplary spectra of pilot signals inputted to the transmission rate modification section 24 in the receiving-end device 2, and the transmission band characteristics of an optical transmission line as estimated from the spectra. In FIGS. 3 and 4, it is assumed that the pilot signals are sine-wave signals having frequencies of 100 MHz, 200 MHz, 400 MHz, respectively. First, the pilot signal generation section 14 in the transmitting-end device 1 outputs pilot signals having the same spectrum size as shown in FIG. 3, the pilot signals being superimposed upon one another. When traveling along the optical transmission line 3, the pilot signals receive restrictions associated with the transmission band of the optical transmission line 3. For example, as shown in FIG. 4, the pilot signals may have spectrum sizes at the receiving-end device 2 such that the pilot signal whose frequency is 400 MHz is greatly attenuated, whereas the pilot signals whose frequencies are 100 MHz and 200 MHz are not substantially attenuated. In this case, the transmission band characteristics of the optical transmission line can be estimated to be as shown by the dotted line in FIG. 4. Thus, the transmission band of the optical transmission line can be detected on the basis of the spectrum sizes of the pilot signals.

Each pilot signal transmitted from the transmitting-end device 1 is a sine-wave signal having a single frequency in the present embodiment. Alternatively, the transmitting-end device may transmit a signal encompassing a certain frequency range. In this case, the receiving-end device extracts a predetermined frequency component from the frequency range of the received signal, and detects the transmission band of the optical transmission line based on the extracted frequency component. Each signal to be used as a pilot signal may be a rectangular-wave signal or a pulse signal, instead of a sine-wave signal.

In the present embodiment, the transmission band of the optical transmission line is detected on the basis of a pilot signal which is transmitted from one device and which is received by another device via the optical transmission line. However, other methods may be employed for detecting the transmission band of the optical transmission line. For example, the transmission band of the optical transmission line can be detected by: transmitting data from a transmitting-end at a plurality of data transmission rates; detecting data errors at a receiving-end; and determining whether or not the optical transmission line is capable of transmitting data at a given data transmission rate (at which data has been transmitted) based on the error rate.

Figure 5:
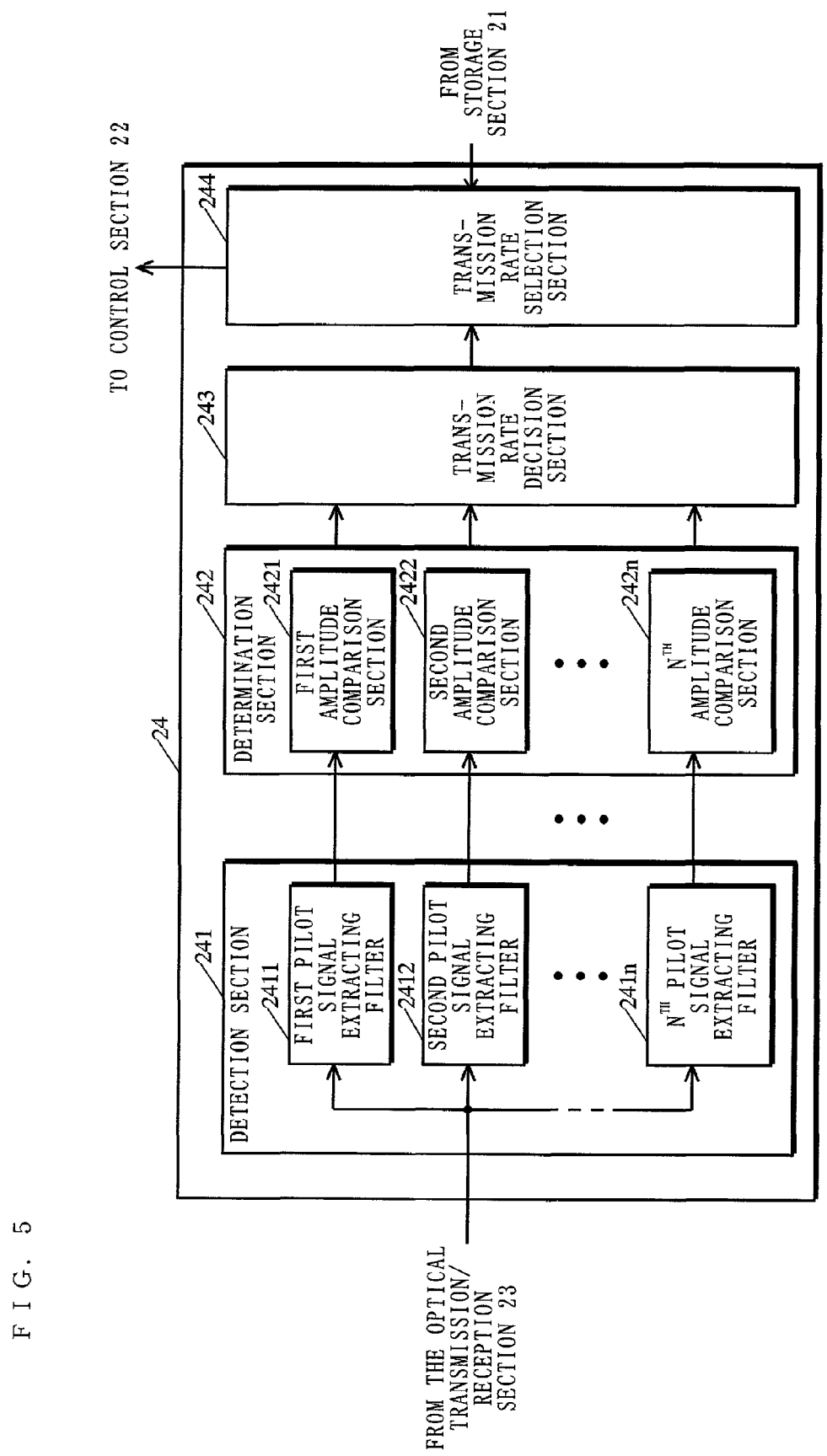
FIG. 5 is a block diagram illustrating the structure of a transmission rate modification section 24.

FIG. 5 is a block diagram illustrating the structure of the transmission rate modification section 24. The transmission rate modification section 24 includes a detection section 241, a determination section 242, a transmission rate decision section 243, and a transmission rate selection section 244. Hereinafter, with reference to FIG. 5, the structures of the respective component elements of the transmission rate modification section 24 will be described.

The detection section 241, which includes first to $n^{th}$ pilot signal extracting filters 2411 to 241n (where n is a natural number), splits the signal inputted from the optical transmission/reception section 23, comprising the superimposed pilot signals, back into the respective pilot signals. Note that n is equal to the number of superimposed pilot signals. As each of the first to $n^{th}$ pilot signal extracting filters 2411 to 241n, a filter having characteristics such that a pilot signal of a predetermined frequency is allowed to pass therethrough while the pilot signals of any other frequencies are not allowed to pass therethrough is used.

For each pilot signal, the determination section 242 determines whether or not the frequency of the pilot signal is within the transmission band of the optical transmission line 3. Specifically, the determination section 242 includes first to $n^{th}$ amplitude comparison sections 2421 to 242n, to which the respective pilot signals that have been split by the detection section 241 are inputted. The determination section 242 compares the amplitude value of each pilot signal against a predetermined value, and outputs a result to the transmission rate decision section 243. In the first embodiment, the aforementioned predetermined value is previously set based on the reception level of a pilot signal in the receiving-end device 2. The first to $n^{th}$ amplitude comparison sections 2421 to 242n compare the amplitude values of the respective pilot signals outputted from the first to $n^{th}$ pilot signal extracting filters 2411 to 241n against the predetermined value. If the comparison result shows that the predetermined value is smaller, then the first to $n^{th}$ amplitude comparison sections 2421 to 242n output data representing "1". The data representing "1" indicates that the frequency of the pilot signal inputted to the amplitude comparison section falls within the transmission band of the optical transmission line. On the other hand, if the comparison result shows that the predetermined value is greater, then the first to $n^{th}$ amplitude comparison sections 2421 to 242n output data representing "0". The data representing "0" indicates that the frequency of the pilot signal inputted to the amplitude comparison section falls outside of the transmission band of the optical transmission line.

Based on the data which is inputted from the determination section 242, the transmission rate decision section 243 determines the maximum data transmission rate at which the optical transmission line 3 is capable of transmitting data. Specifically, the transmission rate decision section 243 selects the highest frequency among the frequencies which have been determined by the determination section 242 to fall within the transmission band of the optical transmission line 3, and outputs the selected frequency as the maximum data transmission rate at which the optical transmission line 3 is capable of transmitting data.

The transmission rate selection section 244 compares the maximum data transmission rate at which the optical transmission line 3 is capable of transmitting data (as determined by the transmission rate decision section 243) against the information of the maximum data transmission rate acceptable to the receiving-end device 2 (which is stored in the storage section 21). The transmission rate selection section 244 selects the data transmission rate having the smaller value, and outputs the selected data transmission rate to the control section 22.

Thus, the transmission rate modification section 24 according to the present embodiment is composed of the detection section 241, the determination section 242, the transmission rate decision section 243, and the transmission rate selection section 244. However, the transmission rate modification section 24 may have any other structure which makes it possible to determine, based on the amplitude of each pilot signal, whether or not the frequency of a pilot signal falls within the transmission band of the optical transmission line, and detect the transmission band of the optical transmission line based on the result of determination, thereby modifying the maximum data transmission rate acceptable to the receiving-end device. The transmission rate decision section 243 and the transmission rate selection section 244 may be implemented by a predetermined programmed operation performed by a CPU in the receiving-end device 2, or may be implemented as a special chip which embodies the control section 22. In other words, the transmission rate decision section 243 and the transmission rate selection section 244 may be realized as functions of the control section 22.

Next, the operation of the transmission rate modification section 24 shown in FIG. 5 will be described with reference to specific examples. For conciseness, it is assumed that n=3, and the three pilot signals have frequencies of 100 MHz, 200 MHz, and 400 MHz, respectively. It is also assumed that the transmission band of the optical transmission line 3 extends up to 200 MHz, and that the maximum data transmission rate acceptable to the receiving-end device 2 is 400 MHz.

First, three pilot signals having frequencies of 100 MHz, 200 MHz, and 400 MHz, respectively, are inputted to the detection section 241, the pilot signals being superimposed upon one another. The detection section 241 splits the signal comprising the three superimposed pilot signals back into pilot signals having frequencies of 100 MHz, 200 MHz, and 400 MHz, respectively. It is assumed that the first pilot signal extracting filter 2411 allows the pilot signal of 100 MHz to pass, the second pilot signal extracting filter 2412 allows the pilot signal of 200 MHz to pass, and the third pilot signal extracting filter 2413 allows the pilot signal of 400 MHz to pass.

The determination section 242 compares the amplitude value of each split pilot signal against the aforementioned predetermined value, and outputs the result to the transmission rate decision section 243. The first amplitude comparison section 2421 compares the amplitude value of the 100 MHz pilot signal which is inputted from the pilot signal extracting filter 2411 against the predetermined value. Since it is assumed herein that the transmission band of the optical transmission line 3 extends up to 200 MHz, the first amplitude comparison section 2421 outputs data representing "1". Similarly, the second and third amplitude comparison sections 2422 and 2423 output data representing "1" and data representing "0", respectively.

Based on the data representing "1", "1", and "0" which are outputted from the amplitude comparison section 2421 to 2423, the transmission rate decision section 243 determines the transmission band of the optical transmission line to be 200 MHz or lower. Note that the determination of the transmission band of the optical transmission line 3 may be made based on a number of data representing "1" among the data which are inputted to the transmission rate decision section 243. Specifically, if the number of data representing "1" among the data inputted to the transmission rate decision section 243 is one, the transmission band of the optical transmission line 3 may be determined to be 100 MHz or lower. If the number of data representing "1" among the data inputted to the transmission rate decision section 243 is two, the transmission band of the optical transmission line 3 may be determined to be 200 MHz or lower. If the number of data representing "1" among the data inputted to the transmission rate decision section 243 is three, the transmission band of the optical transmission line 3 may be determined to be 400 MHz or lower. In the illustrated example, since the data which are inputted to the transmission rate decision section 243 are "1", "1", and "0", the transmission rate decision section 243 determines the transmission band of the optical transmission line 3 to be 200 MHz or lower, and outputs this information to the transmission rate selection section 244.

The transmission rate selection section 244 receives the information (i.e., 400 MHz) of the data transmission rate acceptable to the receiving-end device 2, which is stored in the storage section 21. Furthermore, the transmission rate selection section 244 compares the information (i.e., 200 MHz) of the transmission band of the optical transmission line 3 against the information (i.e., 400 MHz) of the data transmission rate acceptable to the receiving-end device 2. Based on the comparison, the transmission rate selection section 244 selects the information representing the smaller value among the two, i.e., 200 MHz, outputs this information to the control section 22. Base on the information representing "200 MHz" which is outputted from the transmission rate selection section 244, the control section 22 performs a data transmission rate arbitration operation. Through the above-described operations, the receiving-end device 2 modifies the maximum data transmission rate acceptable to the receiving-end device 2 by taking into account the transmission band of the optical transmission line 3 having been detected on the basis of the pilot signal(s).

Figure 6:
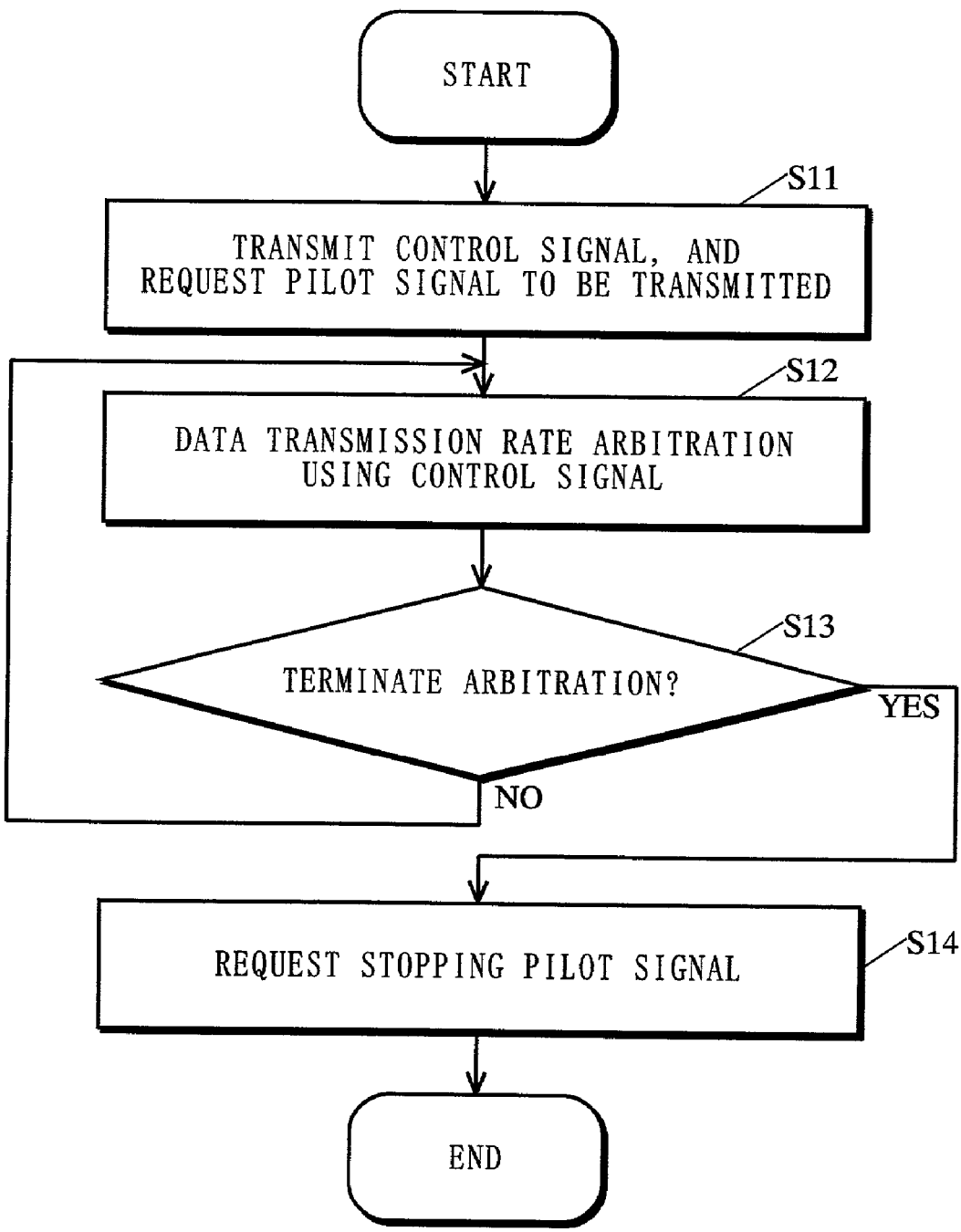
FIG. 6 is a flowchart illustrating the operation of a control section 12 in a transmitting-end device 1 during a data transmission rate arbitration operation.

Next, with reference to FIGS. 6 and 7, a data transmission rate arbitration operation of the optical communication system according to the first embodiment will be described. FIG. 6 is a flowchart illustrating the operation of the control section 12 in the transmitting-end device 1 during a data transmission rate arbitration operation. The operation of the control section 12 begins in response to a system reset, or the transmitting-end device 1 being turned on. First, the control section 12 transmits a control signal, and a requests the pilot signal generation section 14 to transmit a pilot signal (step S11). The control signal transmitted at step S11 is employed for the detection of a connection of the receiving-end device 2. Through the process of step S11, the control signal and the pilot signal(s) are transmitted from the transmitting-end device 1 to the receiving-end device 2. Having received the control signal and the pilot signal(s), the receiving-end device 2 determines a data transmission rate which is compliant with the transmission band of the optical transmission line 3. Furthermore, the receiving-end device 2 transmits, via a control signal, a response to the detection of a connection and the information of the data transmission rate which is compliant with the transmission band of the optical transmission line 3, to the transmitting-end device 1. In response to these, the control section 12 performs a data transmission rate arbitration by using a control signal (step S12). Hereinafter, the details of the operation of step S12 will be described.

The control section 12 compares the information of the data transmission rate received from the receiving-end device 2 against the data transmission rate information transmitted from the control section 12. Based on the comparison, the control section 12 transmits the information of the data transmission rate having the small value to the receiving-end device 2. Note that, when the control section 12 receives data transmission rate information for the first time, the control section 12 has not transmitted data transmission rate information yet. In that case, the control section 12 compares the data transmission rate information received from the receiving-end device 2 against the information of the maximum data transmission rate acceptable to the transmitting-end device 1. Based on the comparison, the control section 12 transmits the information of the data transmission rate having the smaller value to the receiving-end device 2. If the data transmission rate information received from the receiving-end device 2 and the data transmission rate information transmitted from the control section 12 have the same value, then the control section 12 transmits, in addition to the data transmission rate information, information notifying the completion of the data transmission rate arbitration to the receiving-end device 2.

Note that the data transmission rate arbitration which is performed based on control signals at step S12 is similar to the conventionally-practiced operation. For example, the IEEE1394 standard, which provides an interface for interconnecting digital devices, may be applied to the optical communication system according to the present embodiment. In other words, the arbitration process at step S12 may entirely be replaced by the arbitration process which is stipulated under the IEEE1394 standard.

Next to step S12, the control section 12 determines whether or not to terminate the data transmission rate arbitration (step S13). The determination at step S13 is made based on whether or not information notifying the completion of the data transmission rate arbitration was received from the other device at step S12. If the data transmission rate arbitration is not to be terminated yet, the control section 12 repeats the operation from steps S12 to S13. On the other hand, if the data transmission rate arbitration is to be terminated, the control section 12 requests the pilot signal generation section 14 to stop the issuance of the pilot signal (step S14), thereby terminating the data transmission rate arbitration. Accordingly, the pilot signal generation section 14 stops the issuance of the pilot signal, so that the transmitting-end device 1 becomes capable of transmitting data.

Figure 7:
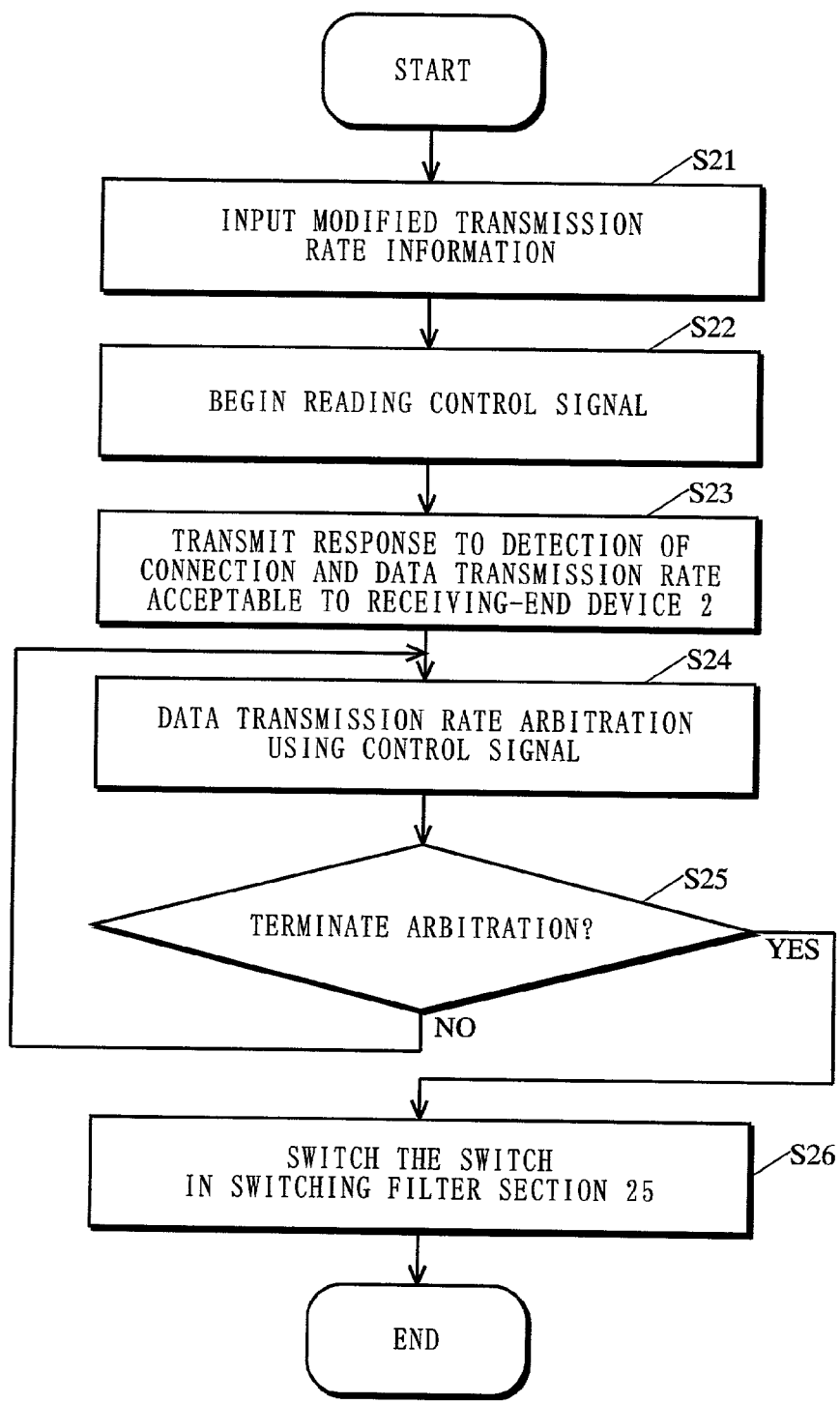
FIG. 7 is a flowchart illustrating the operation of a control section 22 in a receiving-end device 2 during a data transmission rate arbitration operation.

FIG. 7 is a flowchart illustrating the operation of the control section 22 in the receiving-end device 2 during a data transmission rate arbitration operation. The operation of the control section 22 begins in response to a system reset, or the receiving-end device 2 being turned on. First, the information of the data transmission rate as modified by the transmission rate modification section 24 is inputted to the control section 22 (step S21). Next, the control section 22 begins reading the control signal (step S22). In other words, the control section 22 keeps ignoring the control signal which is transmitted from the transmitting-end device 1 until the process of step S21 is completed. Furthermore, the control section 22 transmits a response to the detection of a connection and the data transmission rate information inputted from the transmission rate modification section 24 at step S21 to the transmitting-end device 1 (step S23). After step S23, the control section 22 performs a data transmission rate arbitration using a control signal (step S24). Hereinafter, the details of the operation of step S24 will be described.

The control section 22 compares the data transmission rate information received from the transmitting-end device 1 against the data transmission rate information transmitted from the control section 22. Based on the comparison, the control section 22 transmits the information of a data transmission rate having the smaller value to the transmitting-end device 1. If the data transmission rate information received from the transmitting-end device 1 and the data transmission rate information transmitted from the control section 22 have the same value, then the control section 22 transmits, in addition to the data transmission rate information, information notifying the completion of the data transmission rate arbitration to the transmitting-end device 1.

Next, the control section 22 determines whether or not to terminate the data transmission rate arbitration (step S25). The determination at step S25 is made based on whether or not information notifying the completion of the data transmission rate arbitration has been received from the other device. If the data transmission rate arbitration is not to be terminated yet, the control section 22 repeats the operation from steps S24 to S25. On the other hand, if the data transmission rate arbitration is to be terminated, the control section 22 switches the switch in the switching filter section 25 (step S26) so as to enable the control section 22 to receive data signals, thereby terminating the data transmission rate arbitration operation.

Figure 8:
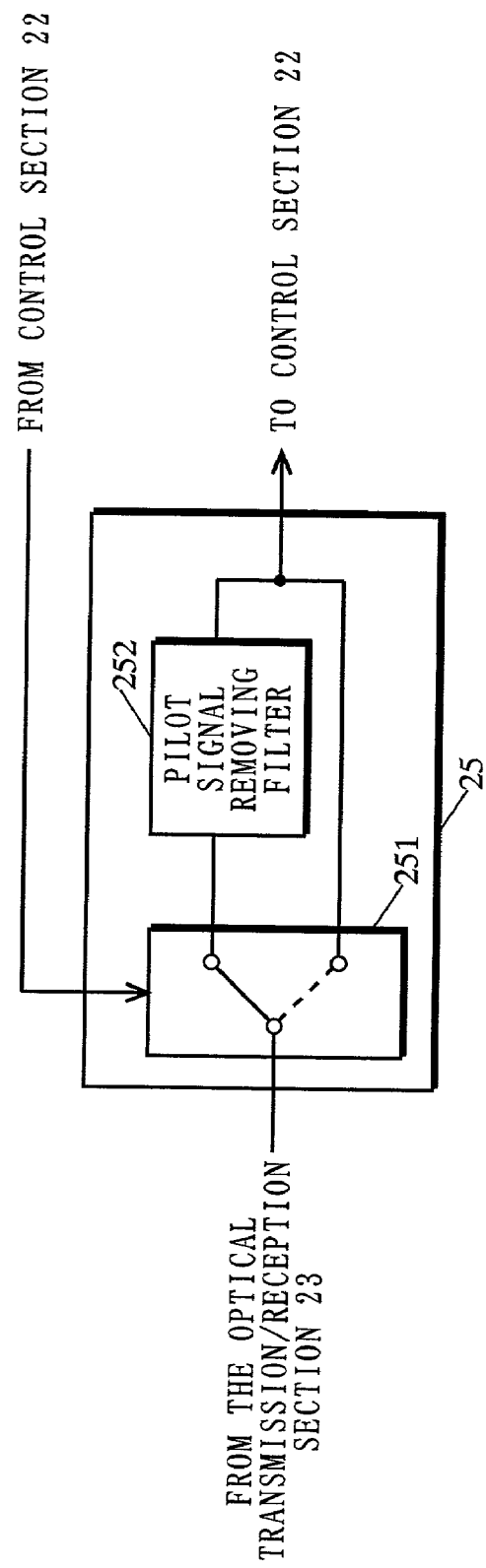
FIG. 8 is a block diagram illustrating the structure of a switching filter section 25.

Next, with reference to FIG. 8, the detailed structure and operation of the switching filter section 25 will be described. FIG. 8 is a block diagram illustrating the structure of the switching filter section 25. As shown in FIG. 8, the switching filter section 25 includes a switch 251 and a pilot signal removing filter 252. The switch 251, which is controlled by the control section 22, is switched after the data transmission rate arbitration operation is terminated. The pilot signal removing filter 252 has characteristics such that the control signals are allowed to pass therethrough whereas the pilot signals are removed. While a data transmission rate arbitration operation is being performed, the switch 251 in the switching filter section 25 is in a position for leading an input signal into the pilot signal removing filter 252, i.e., the state illustrated in FIG. 8. Accordingly, an input signal from the optical transmission/reception section 23 will have its pilot signal component removed, so that only the control signal component will be inputted to the control section 22.

On the other hand, after the termination of the data transmission rate arbitration operation, a data transmission is begun. The data signal used for the data transmission has a similar frequency to that of a pilot signal. Therefore, if the switching filter section 25 remains in the state illustrated in FIG. 8, the pilot signal removing filter 252 will remove the data signal, making it impossible for the control section 22 to receive the data signal. Accordingly, after the termination of the data transmission rate arbitration operation, the switch 251 is switched by the control section 22 into a position opposite from that shown in FIG. 8, i.e., a position for not leading the input signal into the pilot signal removing filter 252. As a result, the control section 22 becomes capable of receiving the data signal.

Figure 9:
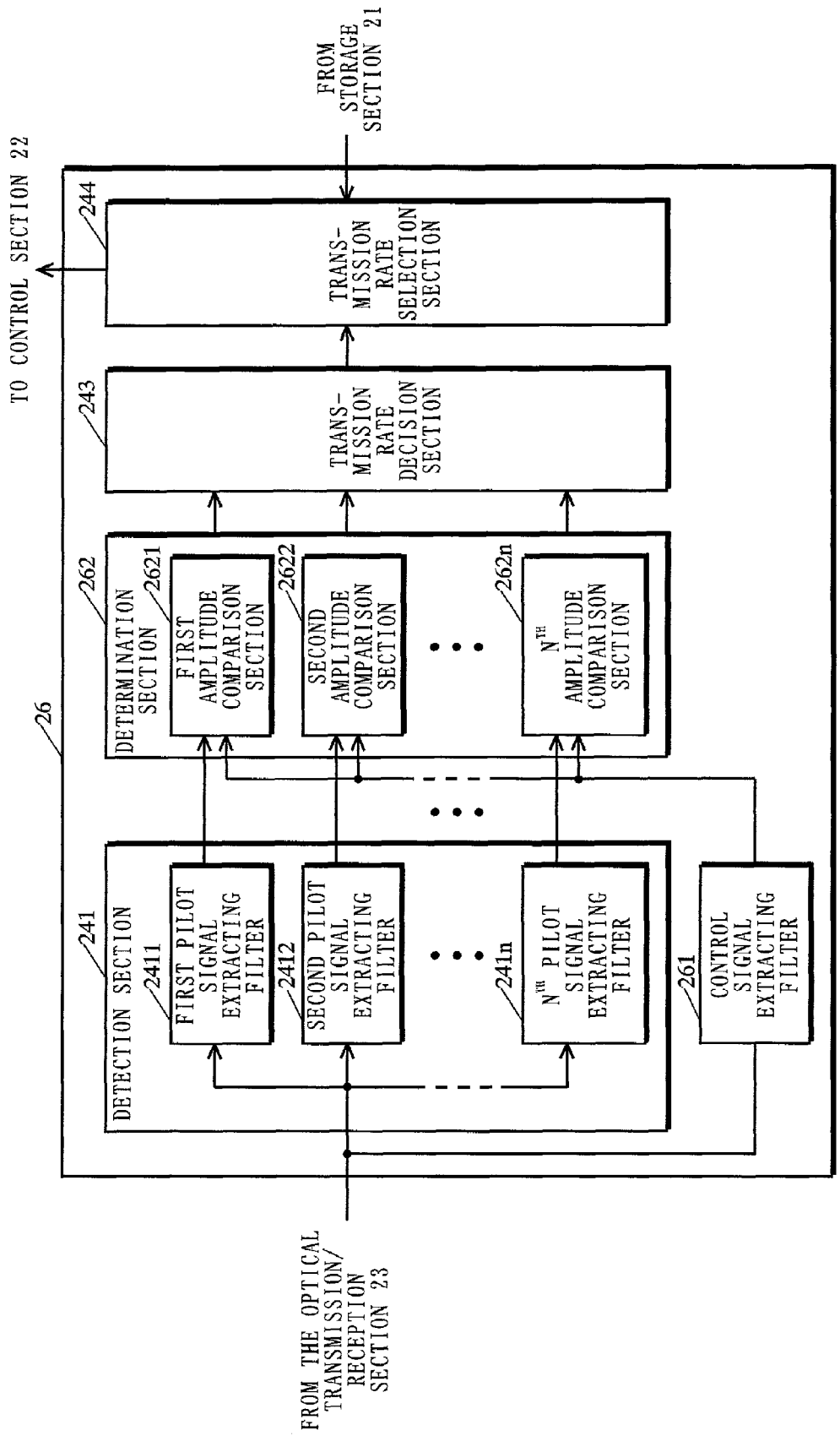
FIG. 9 is a block diagram illustrating the structure of a transmission rate modification section 26 employed in a second embodiment of the present invention.
Figure 10:
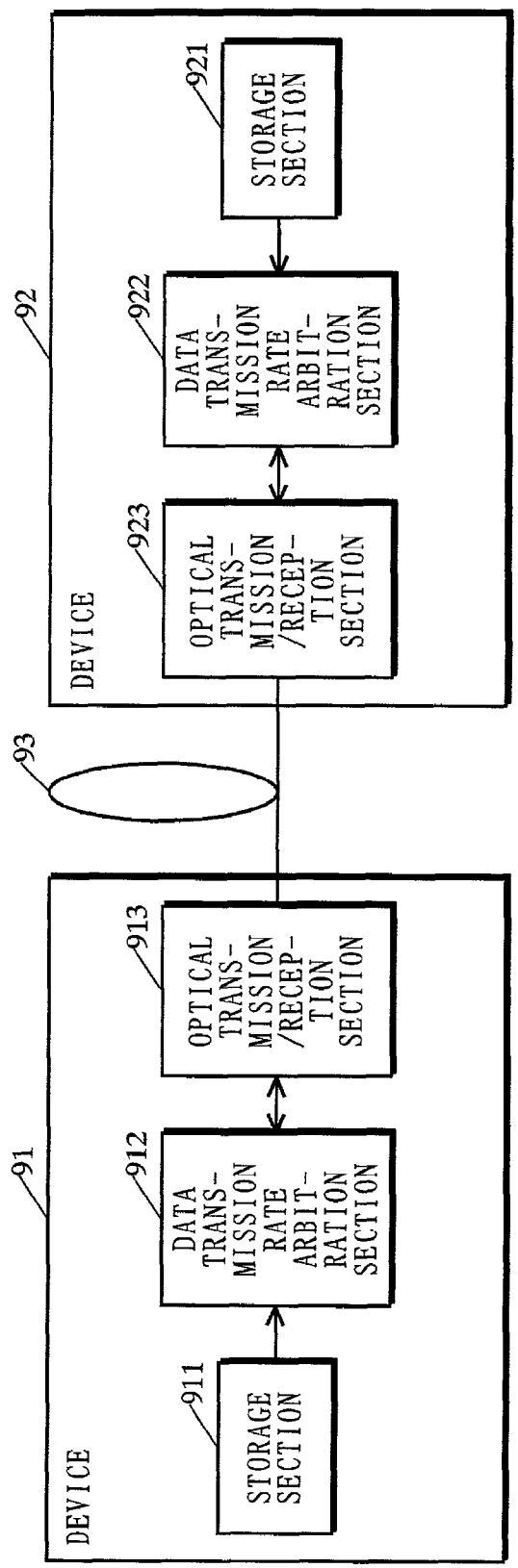
FIG. 10 is a block diagram illustrating the structure of a conventional optical communication system.

Next, a second embodiment according to the present invention will be described. In the second embodiment, a transmission rate modification section 26 shown in FIG. 9 is employed instead of the transmission rate modification section 24 shown in FIG. 5. FIG. 9 is a block diagram illustrating the structure of the transmission rate modification section 26 used in the second embodiment of the present invention. In FIG. 9, the transmission rate modification section 26 includes a detection section 241, a control signal extracting filter 261, a determination section 262, a transmission rate decision section 243, and a transmission rate selection section 244. In FIG. 9, those component elements which also appear in FIG. 5 are denoted by the same reference numerals. Hereinafter, the detailed structure of the transmission rate modification section 26 shown in FIG. 9 will be described.

The control signal extracting filter 261 extracts a control signal from the pilot signal(s) and the control signal inputted from the optical transmission/reception section 23. In other words, the control signal extracting filter 261 has characteristics such that the control signal is to allowed to pass therethrough, while the pilot signals are not allowed to pass therethrough.

The determination section 262, which includes first to $n^{th}$ amplitude comparison sections 2621 to 262$n$, receives the pilot signals which have been split by the receives detection section 241 and the control signal which has been extracted through the control signal extracting filter 261. The determination section 262 compares the amplitude value of each pilot signal against a predetermined value, and outputs the result to the transmission rate decision section 243. According to the second embodiment, the predetermined value is determined based on the amplitude value of the control signal which is inputted to the first to $n^{th}$ amplitude comparison sections 2621 to 262$n$. In the present embodiment, it is assumed that the predetermined value is a value which is a multiple of the amplitude value of the control signal. The first to $n^{th}$ amplitude comparison sections 2621 to 262$n$ compare the amplitude values of the pilot signals which are outputted from the first to $n^{th}$ pilot signal extracting filters 2411 to 241$n$ against the predetermined value. If the predetermined value is smaller, the amplitude comparison sections 2621 to 262$n$ output data representing "1". The data representing "1" indicates that the frequency of the pilot signal inputted to the amplitude comparison section falls within the transmission band of the optical transmission line. On the other hand, if the predetermined value is greater, the first to $n^{th}$ amplitude comparison sections 2621 to 262$n$ output data representing "0". The data representing "0" indicates that the frequency of the pilot signal inputted to the amplitude comparison section falls outside of the transmission band of the optical transmission line. Thus, according to the second embodiment, as in the first embodiment, it is possible to determine whether or not the frequency of each pilot signal falls within the transmission band of the optical transmission line 3.

In accordance with the optical communication system according to the first and second embodiments, it is determined based on the amplitude value of each pilot signal and a predetermined value whether the transmission band of the optical transmission line 3 will be inadequate or not. Specifically, the first to $n^{th}$ amplitude comparison sections 2421 to 242$n$ (2621 to 262$n$) in the receiving-end device 2 determine that the optical transmission line 3 is incapable of transmitting data if the amplitude value of the pilot signal is smaller than the predetermined value.

According to the first embodiment, the predetermined value employed in the first to $n^{th}$ amplitude comparison sections 2421 to 242$n$ in the determination section 242 of the transmission rate modification section 24 is a previously-set, fixed value. Therefore, if the amplitude value of a given pilot signal is smaller than the previously-set fixed value, the first to $n^{th}$ amplitude comparison sections 2421 to 242$n$ determine that the frequency of the pilot signal falls outside of the transmission band of the optical transmission line 3. However, the reason why the amplitude value of the pilot signal becomes smaller than the previously-set fixed value may be attributable not only to the inadequate transmission band of the optical transmission line 3, but also to some other causes, e.g., a problem in the transmitting-end device 1, or losses in the optical transmission line 3 other than the inadequacy of the transmission band. For example, the amplitude value of a pilot signal may become smaller than the previously-set fixed value if the intensity of the optical signal obtained from the electro-photo conversion by the optical transmission/reception section 13 is insufficient. Therefore, the first to $n^{th}$ amplitude comparison sections 2421 to 242$n$ may erroneously determine that the frequency of the pilot signal falls outside of the transmission band of the optical transmission line 3 when the real cause lies in the transmitting-end device 1. In this respect, the determination as to whether the frequency of a pilot signal falls within the transmission band of the optical transmission line 3 or not, as made by the first to $n^{th}$ amplitude comparison sections 2421 to 242$n$ according to the first embodiment, depends on the conditions of the transmitting-end device 1.

On the other hand, according to the second embodiment, the predetermined value employed in the first to $n^{th}$ amplitude comparison sections 2621 to 262$n$ in the determination section 262 of the transmission rate modification section 26 is a value which is a multiple of the amplitude value of the control signal. Accordingly, the first to $n^{th}$ amplitude comparison sections 2621 to 262$n$ determine that the frequency of a pilot signal falls outside of the transmission band of the optical transmission line 3 if the amplitude value of the pilot signal is smaller than the multiple of the amplitude value of the control signal. If the transmission band of the optical transmission line 3 is inadequate, the amplitude value of the pilot signal will become smaller than the multiple of the amplitude value of the control signal, so that it will be correctly determined that the frequency of the pilot signal falls outside of the transmission band of the optical transmission line 3. On the other hand, if the amplitude of a pilot signal is reduced due to an insufficient output level of the transmitting-end device 1 or a cause in the optical transmission line 3 other than an inadequate transmission band, the amplitude of the control signal will also decrease accordingly. Therefore, the amplitude value of the pilot signal will be greater than the multiple of the amplitude value of the control signal. Thus, if the amplitude of the pilot signal is reduced due to some cause in the transmitting-end device 1, it is correctly determined the frequency of the pilot signal falls within the transmission band of the optical transmission line 3. Thus, in accordance with the first to $n^{th}$ amplitude comparison sections 2621 to 262$n$ of the second embodiment, the determination as to whether the frequency of a pilot signal falls within the transmission band of the optical transmission line 3 or not does not depend on the conditions of the transmitting-end device 1. In other words, the determination as to whether the frequency of a pilot signal falls within the transmission band of the optical transmission line 3 or not can be made with an increased accuracy in the second embodiment of the present invention than in the first embodiment of the present invention.

In other embodiments, the transmitting-end device 1 or the receiving-end device 2 may display a message to a user if a data transmission rate which is determined through an arbitration process becomes lower than the data transmission rate acceptable to the device, by employing a display device (typically an LED (Light Emitting Diode). Hereinafter, such an arrangement will be specifically described with respect to the transmitting-end device 1.

It is assumed that the transmitting-end device 1 includes an LED as a display device, the LED being controlled by the control section 12. After the data transmission rate arbitration operation is terminated, the control section 12 determines whether or not a data transmission rate which is determined through an arbitration process has become lower than (hereinafter simply referred to as "slowed down") the data transmission rate acceptable to the device. This determination can be made by the following method, for example.

After the arbitration operation is terminated (e.g., after step S14 in FIG. 6), the control section 12 compares the two pieces of information stored in the storage section 11, i.e., the information of the maximum data transmission rate acceptable to the device and the information of a data transmission rate transmitted from the control section 12. When the arbitration operation has just been terminated, the information of a data transmission rate transmitted from the control section 12 represents a data transmission rate which has been determined through the arbitration process. Therefore, the control section 12 can determine whether or not the data transmission rate has "slowed down" by comparing the aforementioned two pieces of information.

The control section 12 determines that the data transmission rate has not "slowed down" if the information of the maximum data transmission rate acceptable to the device is equal to the information of a data transmission rate transmitted from the control section 12. On the other hand, the control section 12 determines that the data transmission rate has "slowed down" if the information of the maximum data transmission rate acceptable to the device is greater than the information of a data transmission rate transmitted from the control section 12. The control section 12 changes the display state of the LED depending on the result of the determination. For example, the control section 12 may turn the LED on to indicate that the data transmission rate has "slowed down", and off to indicate that the data transmission rate has not "slowed down".

Thus, a user can know whether the data transmission rate has "slowed down" or not. Note that this arrangement is applicable to the receiving-end device 2 as well as to the transmitting-end device 1. Furthermore, if both devices have a display function, it is possible to identify not only whether or not the data transmission rate has "slowed down", but also the reason why the data transmission rate has "slowed down". In other words, it is possible to determine whether the data transmission rate has "slowed down" because of the data transmission rate of the other device or because of the transmission band of the optical fiber.

Specifically, if only one of the transmitting-end device 1 and the receiving-end device 2 determines that the data transmission rate has "slowed down", it is clear that the data transmission rate is based on the maximum data transmission rate of the device whose data transmission rate has not "slowed down". Therefore, in this case, the cause for the "slowing down" of the data transmission rate is in the other device (i.e., the device whose data transmission rate has not "slowed down"). On the other hand, if both the transmitting-end device and the receiving-end device determine that the data transmission rate has "slowed down", it is known that neither device is the cause and that the slowing down is ascribable to the optical fiber (for, if either device was the cause, the data transmission rate of that device would not be determined as having "slowed down").

Thus, in the case where both the transmitting-end device and the receiving-end incorporate a display device, a user can know the cause for "slowing down" of the data transmission rate, and realize that the optical fiber which is currently used in the system must be replaced with an optical fiber having an appropriate transmission band.

While the invention has been described in detail, the foregoing description is in all aspects illustrative and not restrictive. It is understood that numerous other modifications and variations can be devised without departing from the scope of the invention.

What is claimed is:

1. A method for arbitrating a data transmission rate between devices in an optical communication system before performing a data transmission between the devices via an optical transmission line, the method comprising:
    detecting a transmission band of the optical transmission line;
    detecting a slower one of maximum data transmission rates acceptable to the devices between which the data transmission is to be performed; and
    designating a data transmission rate as a data transmission rate for the data transmission, the data transmission rate being within the detected transmission band of the optical transmission line and equal to or less than the detected slower maximum data transmission rate,
    wherein the detecting of the transmission band of the optical transmission line comprises:
        transmitting a predetermined pilot signal comprising at least one cycle signal having a predetermined cycle from a first of the devices to a second of the devices; and
        detecting the transmission band of the optical transmission line based on a received state of the predetermined pilot signal as received by the second device, and
    wherein the detecting of the transmission band of the optical transmission line based on the received state of the predetermined pilot signal comprises:
        determining whether or not a frequency corresponding to the predetermined cycle of each of the at least one cycle signal is within the transmission band of the optical transmission line based on a waveform of the at least one cycle signal as received by the second device; and
        determining the transmission band of the optical transmission line based on a highest one among frequencies which are determined as being within the transmission band of the optical transmission line.

2. The method according to claim 1 wherein the determining of whether or not the frequency corresponding to the predetermined cycle of each of the at least one cycle signal is within the transmission band of the optical transmission line is based on whether or not an amplitude value of the at least one cycle signal as received by the second device is greater than a predetermined value.

3. The method according to claim 1,
    wherein the detecting of the slower one of maximum data transmission rates comprises exchanging control signals between the devices, each control signal representing a data transmission rate acceptable to each of the devices, and
    wherein the determining of whether or not the frequency corresponding to the predetermined cycle of each of the at least one cycle signal is within the transmission band of the optical transmission line comprises comparing an amplitude value of the at least one cycle signal as received by the second device to an amplitude value of the control signal as received by the second device.

4. The method according to claim 1, wherein a number of data transmission rates having discrete values are stipulated in the optical communication system, and
    wherein the predetermined cycle of each of the at least one cycle signal is set based on, among the discrete values, a value of the data transmission rate acceptable to the first device which transmits the at least one cycle signal.

5. The method according to claim 4,
    wherein a number of cycle signals in the predetermined pilot signal is equal to the number of data transmission rates acceptable to the first device which transmits the cycle signals.

6. The method according to claim 1, further comprising:
    modifying, if the maximum data transmission rate acceptable to the second device receiving the pilot signal is outside of the transmission band determined by the determining of the transmission band of the optical transmission line, a value of the maximum data transmission rate acceptable to the second device to a greatest one of data transmission rates which are within the transmission band of the optical transmission line.

7. An optical communication apparatus for performing a data transmission with another device via an optical transmission line, wherein the optical communication apparatus arbitrates a data transmission rate between itself and the other device before performing the data transmission, the optical communication apparatus comprising:
    a transmission band detection section for detecting a transmission band of the optical transmission line;
    an arbitration section for arbitrating a data transmission rate between the optical communication apparatus and the other device to ensure that the data transmission is performed at a data transmission rate which is equal to or less than a slower one of maximum data transmission rates acceptable to the optical communication apparatus and the other device; and
    a transmission rate restriction section for restricting the arbitration made by the arbitration section based on the transmission band detected by the transmission band detection section so that the arbitrated data transmission rate is within the transmission band detected by the transmission band detection section,
    wherein the transmission band detection section is operable to detect the transmission band of the optical transmission line based on a received state of a pilot signal comprising at least one cycle signal having a predetermined cycle which is transmitted from the other device via the optical transmission line, and
    wherein the transmission band detection section comprises:
        a determination section for determining whether or not a frequency corresponding to the predetermined cycle of each of the at least one cycle signal is within the transmission band of the optical transmission line based on a received waveform of the at least one cycle signal; and
        a transmission band decision section for determining the transmission band of the optical transmission line based on a highest one among frequencies which are determined by the determination section as being within the transmission band of the optical transmission line.

8. The optical communication apparatus according to claim 7, wherein the determination section is operable to determine whether or not the frequency corresponding to the predetermined cycle of each of the at least one cycle signal is within the transmission band of the optical transmission line based on whether or not an amplitude value of the at least one cycle signal is greater than a predetermined value.

9. The optical communication apparatus according to claim 7 wherein the determination section is operable to determine whether or not the frequency corresponding to the predetermined cycle of each of the at least one cycle signal is within the transmission band of the optical transmission line based on a comparison between an amplitude value of the at least one cycle signal and an amplitude value of a control signal which is transmitted from the other device for the arbitration of the data transmission rate.

10. The optical communication apparatus according to claim 7, wherein the transmission rate restriction section is operable to restrict the arbitration made by the arbitration section by modifying, if the maximum data transmission rate acceptable to the optical communication apparatus is outside of the transmission band as detected by the transmission rate detection section, a value of the maximum data transmission rate acceptable to the optical communication apparatus to a greatest one of data transmission rates which are within the transmission band of the optical transmission line, and wherein the arbitration section is operable to arbitrate the data transmission rate between the optical communication apparatus and the other device after the data transmission rate is modified by the transmission rate restriction section.

* * * * *